United States Patent [19]
Yamamoto et al.

[11] Patent Number: 5,755,303
[45] Date of Patent: May 26, 1998

[54] POWER TRANSMITTING APPARATUS FOR A HYBRID VEHICLE

[75] Inventors: Yoshio Yamamoto; Katsuyoshi Chubachi, both of Wako, Japan

[73] Assignee: Honda Giken Kogyo Kabushiki Kaisha, Tokyo, Japan

[21] Appl. No.: 753,043

[22] Filed: Nov. 19, 1996

[30] Foreign Application Priority Data

Apr. 2, 1996 [JP] Japan ................................. 8-080356

[51] Int. Cl.$^6$ ................ B60K 1/00; B60K 17/00; B60K 41/12
[52] U.S. Cl. .......... 180/65.2; 180/65.3; 180/65.4; 180/165; 477/46; 477/3
[58] Field of Search ................ 180/65.2, 65.3, 180/65.4, 65.6, 69.4, 205, 206, 165; 477/46, 2, 3; 474/84, 88

[56] References Cited

U.S. PATENT DOCUMENTS

| | | | |
|---|---|---|---|
| 4,126,200 | 11/1978 | Miller et al. | 180/165 |
| 4,588,040 | 5/1986 | Albright, Jr. et al. | 180/165 |
| 4,884,653 | 12/1989 | Kuono | 180/233 |
| 4,987,967 | 1/1991 | Kouno | 180/233 |
| 5,492,189 | 2/1996 | Kriegler et al. | 180/65.2 |
| 5,495,912 | 3/1996 | Gray, Jr. et al. | 180/165 |
| 5,558,595 | 9/1996 | Schmidt et al. | 477/3 |
| 5,635,805 | 6/1997 | Ibaraki et al. | 318/139 |
| 5,667,029 | 9/1997 | Urban et al. | 180/65.2 |
| 5,697,466 | 12/1997 | Moronto et al. | 180/65.2 |
| 5,704,440 | 1/1998 | Urban et al. | 180/65.2 |

FOREIGN PATENT DOCUMENTS 2-3101   1/1990   Japan .

*Primary Examiner*—Brian L. Johnson
*Assistant Examiner*—Bridget Avery
*Attorney, Agent, or Firm*—Merchant, Gould, Smith, Edell, Welter & Schmidt, P.A.

[57] ABSTRACT

A power transmitting mechanism for use in a hybrid vehicle includes first and second continuously variable transmissions connected to an output shaft of a vehicle's engine. The first continuously variable transmission causes left and right wheels to rotate via a starting clutch, differential gear and vehicle's axle. The second continuously variable transmission drives a generator/motor and also drives pulleys that are provided for actuating auxiliaries such as an air-conditioning compressor and power-steering compressor. In acceleration of the vehicle, the generator/motor operates as an electro motor so that the axle can be driven by a combination of the output power of the engine and generator/motor. In deceleration of the vehicle, the generator/motor operates as a power generator so as to effectively collect, from the axle, decreasing energy of the vehicle. In this case, a transmission ratio of the second continuously variable transmission can be chosen to be a substantial reciprocal of a transmission ratio of the first continuously variable transmission such that the generator/motor achieves a highest possible operating efficiency. As a result, irrespective of variations in the number of rotations of the engine, the generator/motor can operate efficiently, which allows the engine, generator/motor and auxiliaries to operate in respective optimum conditions.

4 Claims, 6 Drawing Sheets

ACCELERATING CONTROL

DECELERATING CONTROL

POWER TRANSMITTING APPARATUS FOR A HYBRID VEHICLE

BACKGROUND OF THE INVENTION

1. Field of the Invention

The present invention relates to an improved power transmitting apparatus for use in a hybrid car or vehicle which permits greatly enhanced performance of a generator/motor and various auxiliaries thereof.

2. Description of the Related Art

Various power transmitting apparatuses for use in hybrid cars or vehicles are used today, one of which is disclosed in Japanese Utility Model Laid-Open Publication No. HEI 2-3101. In this disclosed power transmitting apparatus, output power from an engine is delivered to an axle by way of a generator/motor and continuously variable transmissions.

As commonly known, the engine and the generator/motor present different output power characteristics. Thus, the power transmitting mechanism in the hybrid vehicle must be constructed with certain special design, in order to combine the output power characteristics of the engine and generator/motor and then extract the respective effective characteristics of the two components independently of each other.

In the disclosed apparatus and other known power transmitting apparatuses, the internal combustion engine is normally equipped with various auxiliaries including a hydraulic pump, compressor and dynamo, and in general, these auxiliaries are driven together by the crankshaft via a timing belt etc. The number of rotations of the crankshaft greatly varies from the minimum during idling rotation of the engine to the maximum during top-speed operation of the engine, and the number of rotations delivered to the auxiliaries would greatly vary in accordance with such variations of the crankshaft.

However, each of the auxiliaries achieve good performance only with a unique appropriate number of rotations; that is, the appropriate number of rotations is different from one auxiliary to another. Therefore, in the past, it was necessary to employ auxiliaries each having a relatively wide range of the appropriate number of rotations, and as a result, it was difficult or impossible to substantially reduce the size and weight of the auxiliaries.

SUMMARY OF THE INVENTION

The present invention provides a power transmitting mechanism for use in a hybrid vehicle, which includes first and second continuously variable transmissions connected to an output shaft of a vehicle's engine. The first continuously variable transmission causes left and right wheels to rotate via a starting clutch, differential gear and vehicle's axle. The second continuously variable transmission drives a generator/motor and also drives pulleys that are provided for actuating auxiliaries such as an air-conditioning compressor and power-steering compressor. In acceleration of the vehicle, the generator/motor operates as a motor so that the axle can be driven by combined output power of the engine and generator/motor. In deceleration of the vehicle, the generator/motor operates as a power generator so as to effectively collect, from the axle, energy of the vehicle.

In this case, a transmission ratio of the second continuously variable transmission can be set such that the generator/motor achieves a highest possible operating efficiency. As a result, irrespective of variations in the number of rotations of the engine, the generator/motor can operate efficiently, which allows the engine, generator/motor and auxiliaries to operate in respective optimum conditions.

Further, according to the present invention, a transmission ratio of the second continuously variable transmission can be chosen to be a substantial reciprocal of a transmission ratio of the first continuously variable transmission. As a result, the number of rotations of the generator/motor and auxiliaries can be set to a generally constant range, and the generator/motor and auxiliaries can operate reliably in respective efficient ranges.

Furthermore, with the present invention, it is possible to substantially narrow the respective rotating ranges of the generator/motor and auxiliaries while securing their good performance.

BRIEF DESCRIPTION OF THE DRAWINGS

For better understanding of the features of the present invention, preferred embodiments of the invention will be described in detail hereinafter with reference to the accompanying drawings, in which:

FIGS. 4A and 4B are graphic representations showing applicable ranges of the generator/motor and auxiliaries in comparison with those in the prior art, of which FIG. 4A shows relationships between amounts of electrical power or torque assist produced by the generator/motor and the number of rotations of the generator/motor and FIG. 4B shows relationships between operating efficiency and number of rotations of the auxiliaries;

DETAILED DESCRIPTION OF THE PREFERRED EMBODIMENTS

Figure 1:
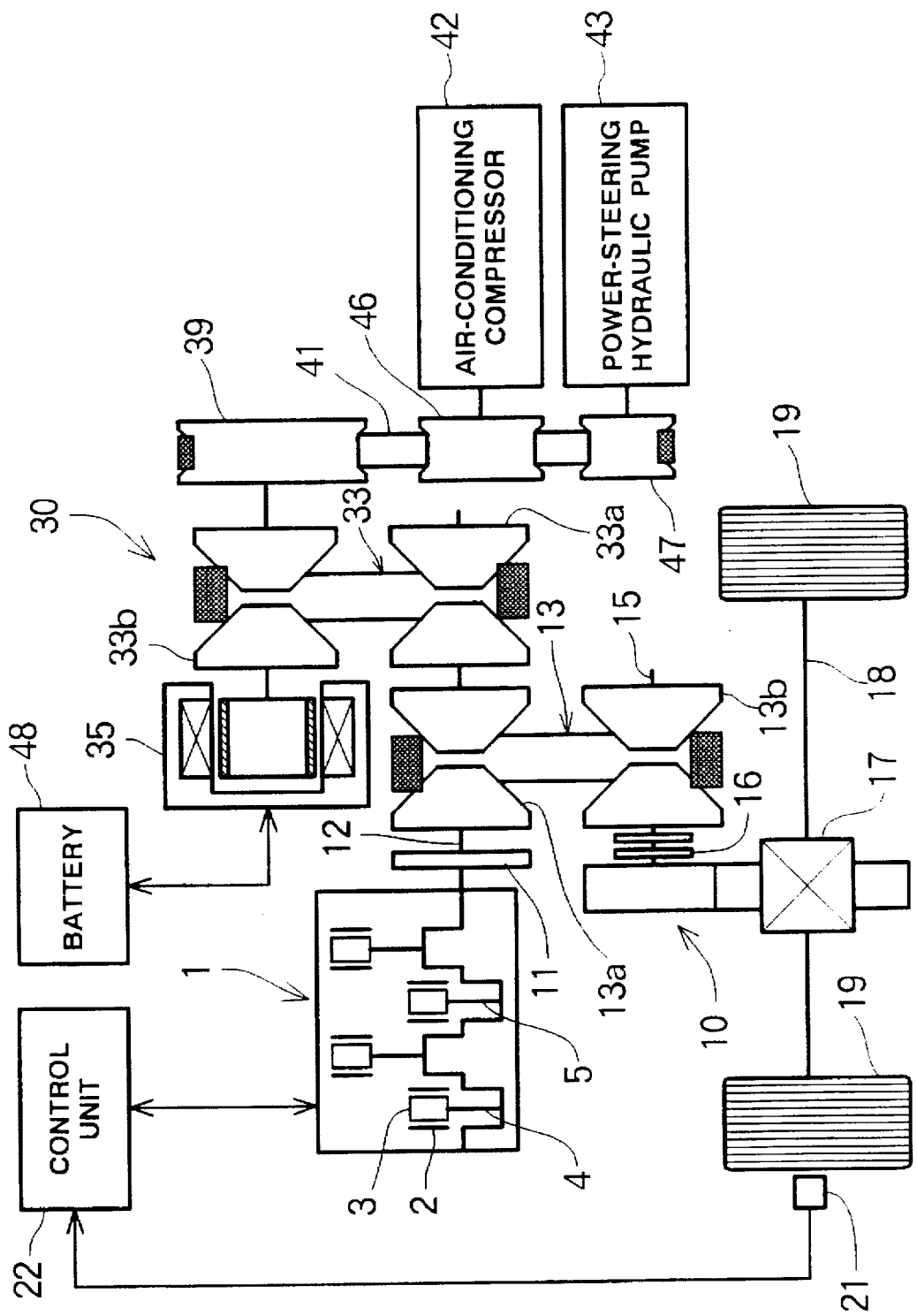
FIG. 1 is a diagram showing a principal part of a power transmitting mechanism for use in a hybrid vehicle according to a first embodiment of the present invention.

FIG. 1 shows a power transmitting mechanism of a hybrid vehicle according to a first embodiment of the present invention, which comprises an engine 1 functioning as a primary driving source of the hybrid vehicle, a power transmitting unit 10, and an auxiliary power transmitting unit 30.

As shown in FIG. 1, the engine 1 includes a plurality of cylinders 2 each receiving a piston 3 for sliding reciprocating movement therealong, a plurality of connecting rods 4 provided in corresponding relations to the pistons 3 and each connected to the corresponding piston for movement therewith, and a crankshaft 5 connected with these connecting rods 4.

The power transmitting unit 10 includes an output shaft 12 coupled via a flywheel 11 to the crankshaft 5, a first continuously variable transmission (which will hereinafter be called a "first transmission") 13 having an input pulley 13a mounted on the output shaft 12 and an output pulley 13b operatively connected via a belt to the input pulley 13a, a wheel driving shaft 15 connected to the output pulley 13b, a starting clutch 16 mounted on the driving shaft 15, a differential gear 17 coupled to the starting clutch 16, an axle 18 connected to the differential gear 17, and a pair of left and right wheels 19 connected to the axle 18. A vehicle velocity sensor 21 is provided near one of the wheels 19 (left wheel in the illustrated example). Each output signal of the vehicle velocity sensor 21 is sent to a control unit 22, in response to which the control unit 22 controls rotating operation of the engine 1.

Further, the auxiliary power transmitting unit 30 includes a second continuously variable transmission (which will hereinafter be called a "second transmission") 33 having an input pulley 33a mounted on the output shaft 12 and an output pulley 33b operatively connected via a belt to the input pulley 33a, a generator/motor 35 coupled with the output pulley 33b, and a pulley 39 for driving auxiliaries. More specifically, the pulley 39 drives an air-conditioning compressor 42 and a power-steering hydraulic pump 43, by means of a belt 41 and pulleys 46, 47 coupled with the compressor 42 and pump 43, respectively. Reference numeral 48 represents a battery.

Figure 2:
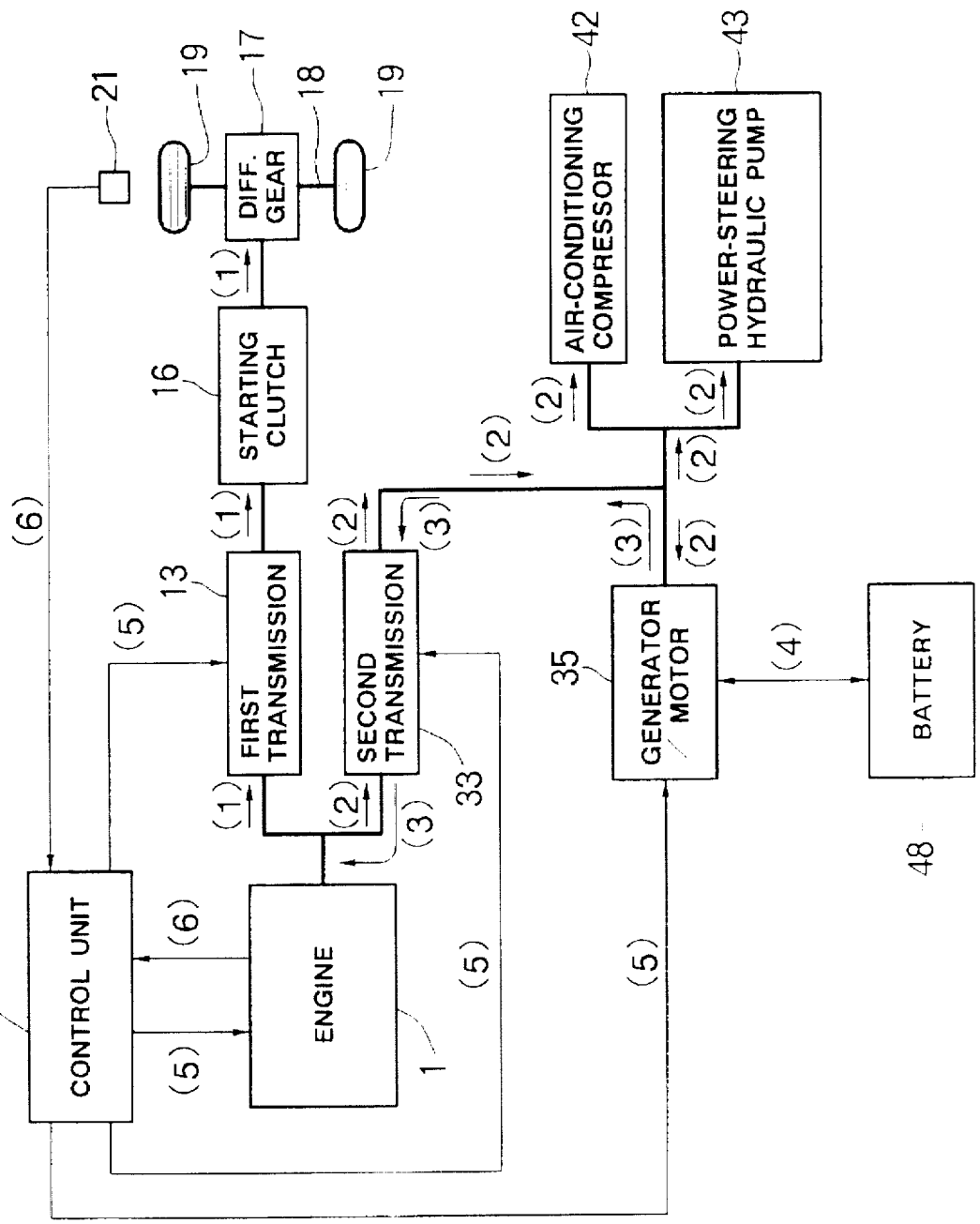
FIG. 2 is a block diagram showing an example of a hardware structure of the power transmitting mechanism shown in FIG. 1.

A description will now be given about exemplary operation of the power transmitting mechanism arranged in the above-mentioned manner, with reference to FIG. 2.

As denoted by arrow (1), output power of the engine 1 is delivered to the differential gear 17 via the first transmission 13 and starting clutch 16, and the differential gear 17 in turn causes the left and right wheels 19 to rotate via the axle 18. As denoted by arrow (2), the output power of the engine 1 also drives the generator/motor 35, air-conditioning compressor 42 and power-steering hydraulic pump 43 via the second transmission 33.

When the generator/motor 35 is used as an electro motor, output power of the motor is delivered via the second transmission 33 to the engine 1 to provide assistance to the rotating operation of the engine 1, as denoted by arrow (3). As further denoted by arrow (4), the generator/motor 35 is connected with the battery 48 in such a manner the generator/motor 35 can be driven by the battery 48 and electrical energy generated by the generator/motor 35 can be supplied to the battery 48.

As denoted by arrow (5), the control unit 22, which controls the overall operations of the engine 1, instructs the first transmission 13 to engage a given transmission ratio for the wheels and also instructs the second transmission 13 to engage a given transmission ratio for the generator/motor 35 and auxiliaries. The control unit 22 also gives the generator/motor 35 instructions about amounts of torque assist and electrical power to be generated thereby. As further denoted by arrow (6), the control unit 22 identifies and uses various current operating conditions of the engine 1 as feedback data; for example, as the feedback data, the control unit 22 identifies and uses a current vehicle velocity detected via the velocity sensor 21 mounted near one of the wheels 19.

FIGS. 3A to 3E are graphic representations of relationships between operational characteristics of various components of the transmitting mechanism and varying vehicle velocity.

Figure 3A:
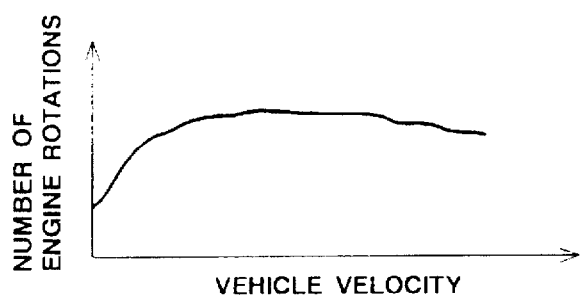
FIGS. 3A to 3E are graphic representations of relationships between operational characteristics of various components of the transmitting mechanism and vehicle velocity, showing the number of rotations of an engine, transmission ratio of a first continuously variable transmission, number of rotations of wheels, transmission ratio of a second continuously variable transmission and number of rotations of a generator/motor, respectively, in relation to varying vehicle velocity.

More specifically, FIG. 3A is a graph showing a characteristic curve, where the vehicle velocity is plotted along the horizontal axis (abscissa) while the number of rotations of the engine 1 is plotted along the vertical axis (ordinate). The number of rotations of the engine 1 is controlled on the basis of the characteristic curve as shown in the figure.

Figure 3B:
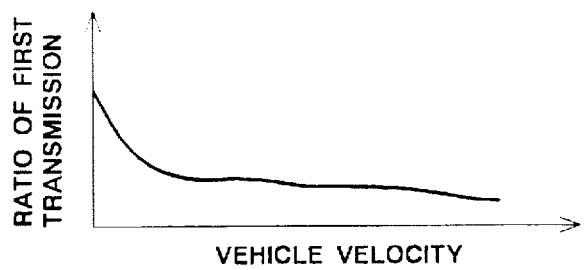

FIG. 3B is a graph showing a characteristic curve, where the vehicle velocity is plotted along the horizontal axis while the transmission ratio of the first transmission 13 is plotted along the vertical axis. The first transmission 13 is controlled on the basis of the rightward-falling characteristic curve in response to the varying vehicle velocity, as shown in the figure.

Figure 3C:
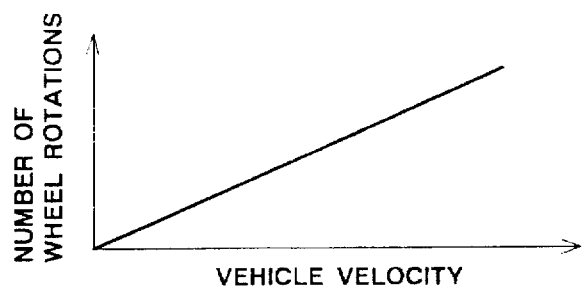

FIG. 3C is a graph showing a characteristic curve, where the vehicle velocity is plotted along the horizontal axis while the number of rotations of the wheels 19 is plotted along the vertical axis. The number of rotations of the wheels 19 is directly proportional to the vehicle velocity. The transmission ratio of the first transmission 13 is set in such a manner that the characteristic curve of FIG. 3C is attained.

Figure 3D:
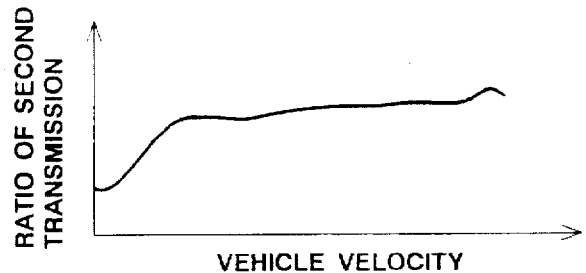

FIG. 3D is a graph showing a characteristic curve, where the vehicle velocity is plotted along the horizontal axis while the transmission ratio of the second transmission 33 is plotted along the vertical axis. The second transmission 33 is controlled on the basis of the rightward-rising characteristic curve in response to the varying vehicle velocity, as shown in the figure.

Figure 3E:
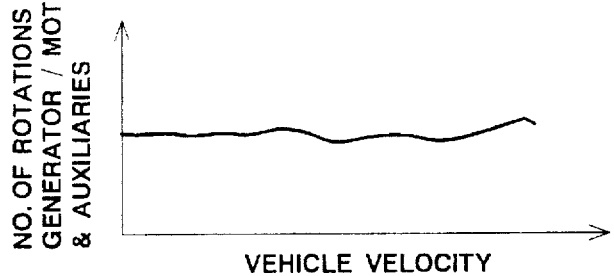

FIG. 3E is a graph showing a characteristic curve, where the vehicle velocity is plotted along the horizontal axis while the number of rotations of the generator/motor 35 and auxiliaries is plotted along the vertical axis. As a result of the number of rotations of the engine 1 being changed by the second transmission 33, the number of rotations of the generator/motor 35 and auxiliaries is kept generally constant irrespective of the varying vehicle velocity. This is because the second transmission 33 has been controlled in such a manner that the number of rotations of the generator/motor 35 and auxiliaries is kept constant.

For improved fuel consumption, it will be very useful to prepare a plurality of different characteristic curves of the number of rotations of the engine 1 shown in FIG. 3A, such as those to be used when the vehicle is to be initially accelerated upon start of running and when the vehicle is to travel at a stable constant speed. In this case, when one characteristic curve of the number of the engine rotations has been changed to another one, it is only sufficient that the characteristic curves of FIGS. 3B and 3D be changed to other optimum curves, depending on the other characteristic curve of the engine rotations, so that the characteristic curves of FIGS. 3C and 3E can be obtained.

Figure 4A:
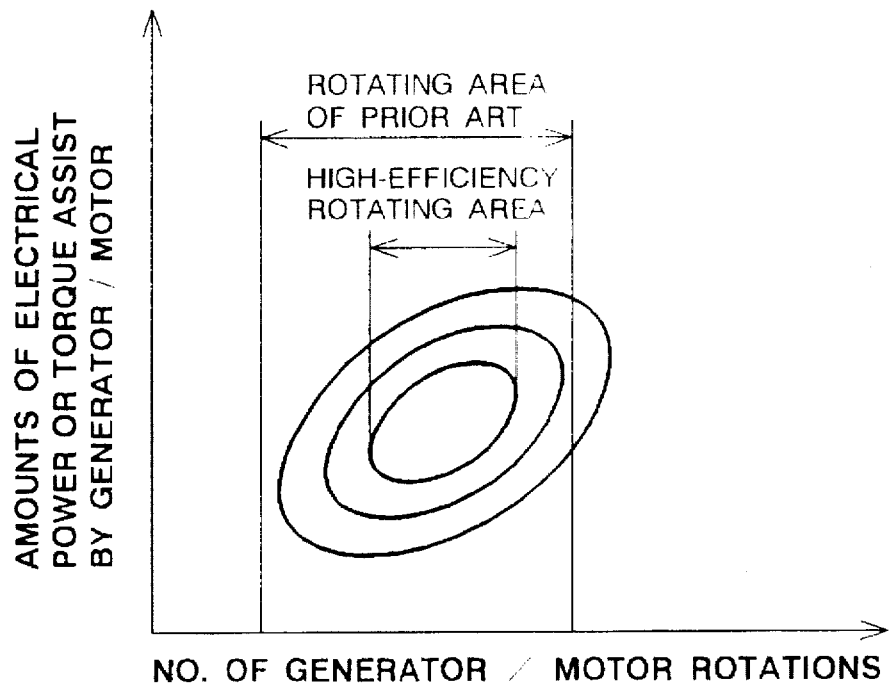
Figure 4B:
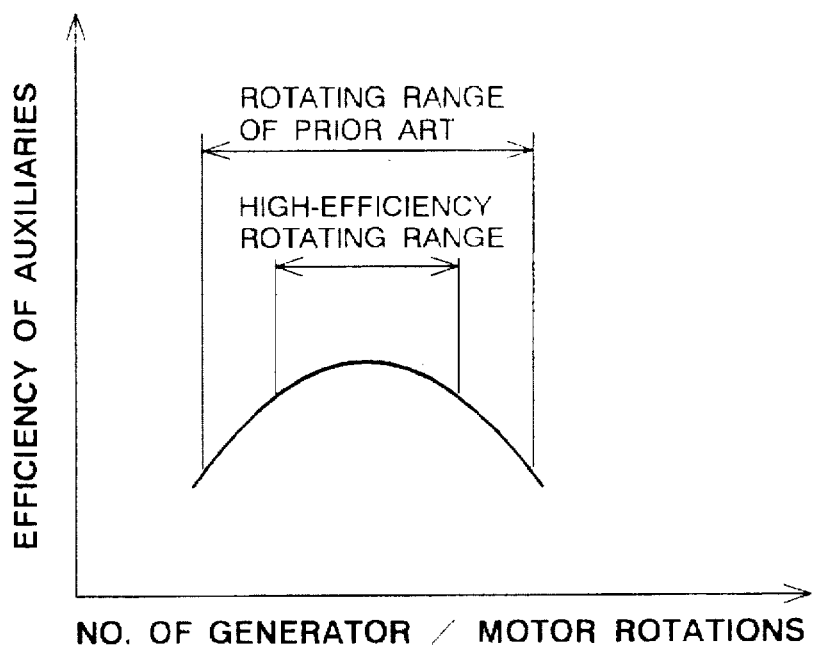

FIGS. 4A and 4B are graphic representations showing applicable ranges of the generator/motor 35 and auxiliaries in comparison with those in the prior art.

FIG. 4A is a graph showing a characteristic curve, where the number of rotations of the generator/motor is plotted along the horizontal axis while amounts of electrical power or torque assist produced by the generator/motor is plotted along the vertical axis. According to the present invention, the transmission ratio of the second transmission 33 is chosen to be a substantial reciprocal of that of the first transmission 13. As a result, the generator/motor 35 of the present invention is allowed to operate within a limited generally constant rotating area to thereby attain higher efficiency than the prior art generator/motor operating in a wider rotating area, as seen from FIG. 4A.

FIG. 4B is a graph showing a characteristic curve, where the number of rotations of the auxiliaries is plotted along the horizontal axis while operating efficiency of the auxiliaries is plotted along the vertical axis. The auxiliaries in the present invention are allowed to operate in a limited generally constant rotating range to thereby attain higher efficiency than the prior art auxiliaries operating in a wider rotating range.

Figure 5A:
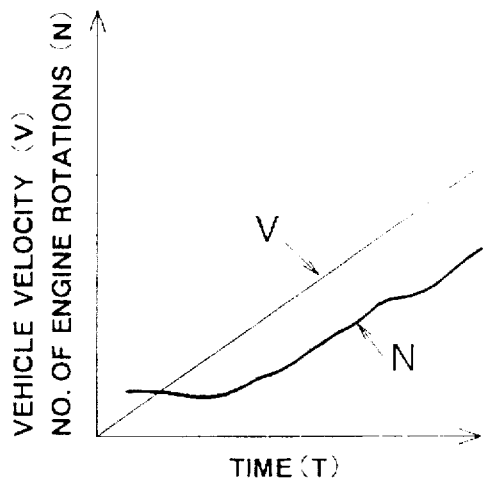
FIGS. 5A and 5B are graphic representations showing comparisons between characteristics of accelerating control employed in the present invention and of that employed in a prior art vehicle.
Figure 5B:
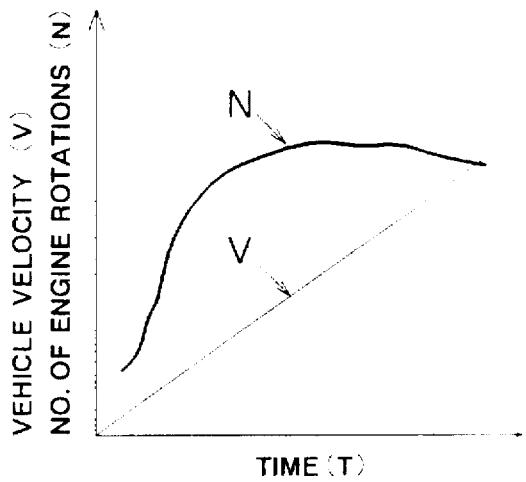

FIGS. 5A and 5B are graphic representations showing comparisons between characteristics of accelerating control employed in the present invention and of that employed in a prior art non-hybrid vehicle, in which the horizontal axis represents passage of time T while the vertical axis represents vehicle velocity V or the number of rotations N of the engine.

FIG. 5A illustrates accelerating control of the transmitting mechanism of the present invention. The vehicle velocity V is controlled so as to increase with elapsed time T, and the number of rotations N of the engine 1 is controlled to increase with the vehicle velocity V in order to provide torque assist via the generator/motor but be limited to a relatively small number even when the engine throttle is open wider than a half-open condition. With this control, fuel consumption can be improved to a significant degree.

FIG. 5B illustrates accelerating control performed in the prior art non-hybrid vehicle. Here, the vehicle velocity V is controlled so as to rise with elapsed time T, but the number of rotations N of the engine needs to be controlled to be relatively great in accordance with a generally chevron-shaped control curve. Thus, this control would result in poor fuel consumption.

Figure 6A:
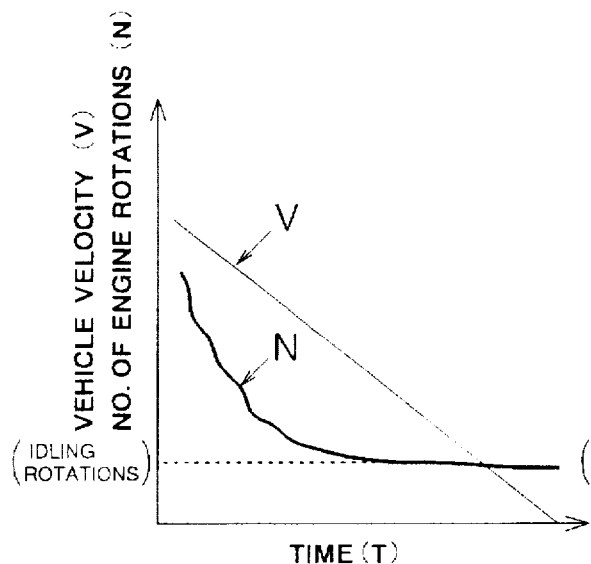
FIGS. 6A and 6B are graphic representations showing comparisons between characteristics of decelerating control employed in the present invention and of that employed in a prior art vehicle.
Figure 6B:
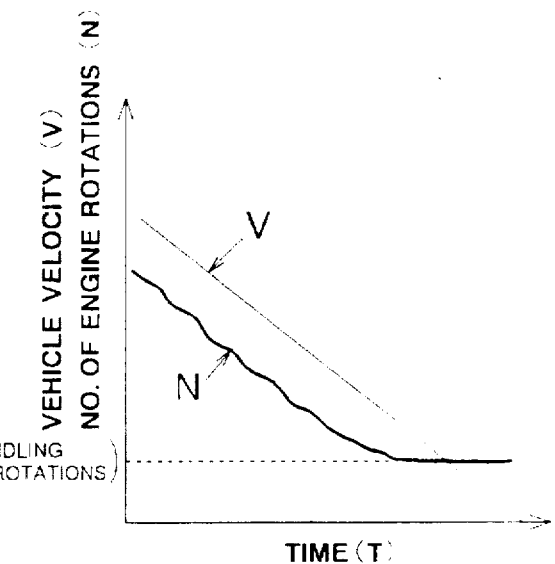

FIGS. 6A and 6B are graphic representations showing comparisons between characteristics of decelerating control employed in the present invention and of that employed in a non-hybrid prior art vehicle, in which the horizontal axis represents passage of time T while the vertical axis represents vehicle velocity V or the number of rotations N of the engine.

FIG. 6A illustrates decelerating control of the transmitting mechanism of the present invention. The vehicle velocity V is controlled so as to fall with elapsed time T, and the number of rotations N of the engine 1 is controlled to rapidly fall to a value within an idling rotation range. Such control can increase regenerative energy of the generator/motor, thereby permitting sufficient electrical power generation.

FIG. 6B illustrates decelerating control performed in the prior art non-hybrid vehicle. Here, the vehicle velocity V is controlled so as to fall with elapsed time T, but the number of rotations N of the engine is controlled to simply or gradually fall to a value within an idling rotation range. Such control can not effectively collect regenerative energy of the generator/motor.

Figure 7:
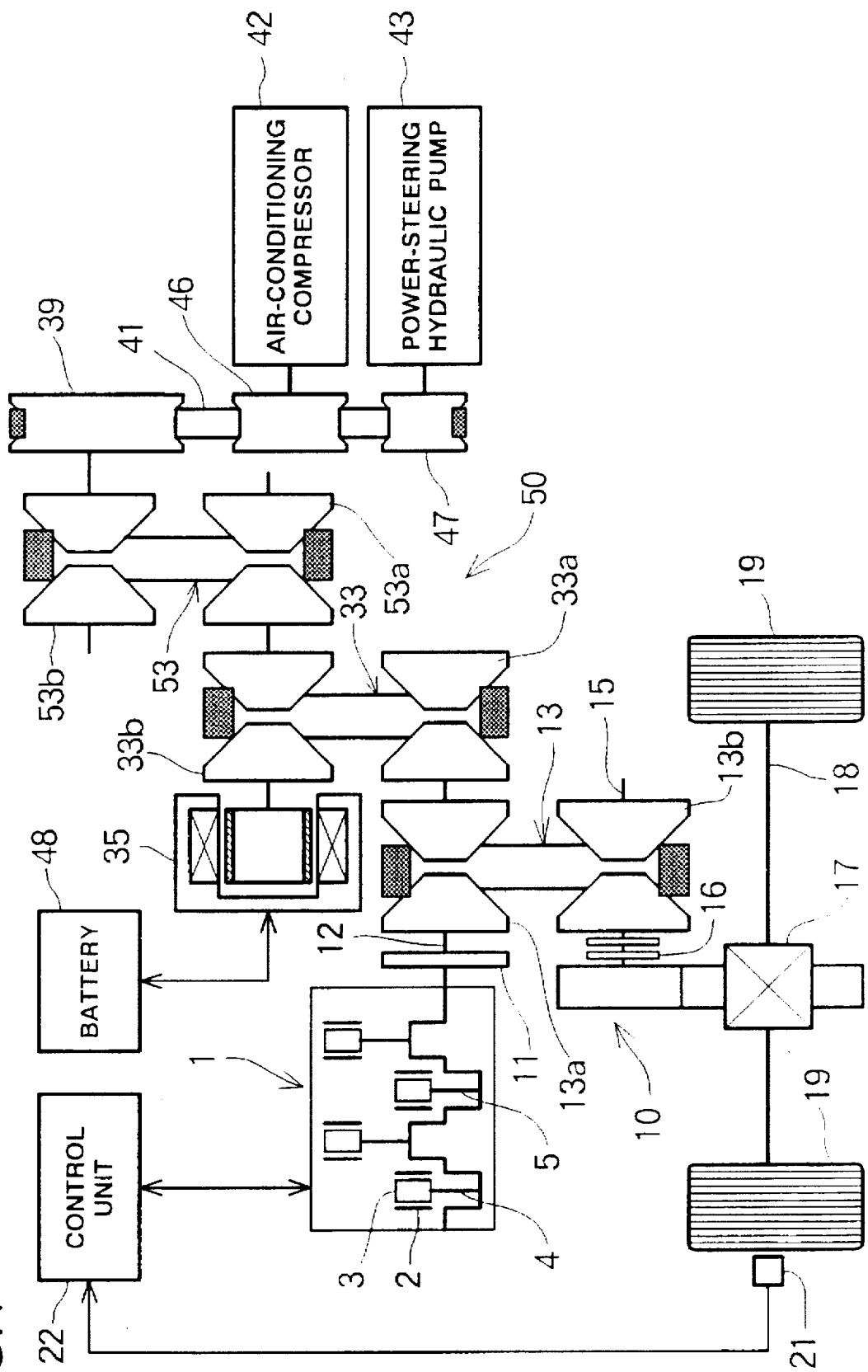
FIG. 7 is a diagram showing a principal part of a power transmitting mechanism for use in a hybrid vehicle according to a second embodiment of the present invention.

FIG. 7 is a diagram showing a principal part of a power transmitting mechanism for use in a hybrid vehicle according to a second embodiment of the present invention, which comprises an engine 1 functioning as a primary driving source of the hybrid vehicle, a power transmitting unit 10, and an auxiliary power transmitting unit 50.

As shown in FIG. 7, the engine 1 includes a plurality of cylinders 2 each receiving a piston 3 for sliding reciprocating movement therealong, a plurality of connecting rods 4 provided in corresponding relations to the pistons 3 and each connected to the corresponding piston for movement therewith, and a crankshaft 5 connected with these connecting rods 4.

The power transmitting unit 10 includes an output shaft 12 coupled via a flywheel 11 to the crankshaft 5, a first continuously variable transmission (which will hereinafter be called a "first transmission") 13 having an input pulley 13a mounted on the output shaft 12 and an output pulley 13b operatively connected via a belt to the input pulley 13a, a wheel driving shaft 15 connected to the output pulley 13b, a starting clutch 16 mounted on the driving shaft 15, a differential gear 17 coupled to the starting clutch 16, an axle 18 connected to the differential gear 17, and a pair of left and right wheels 19 connected to the axle 18. A vehicle velocity sensor 21 is provided near one of the wheels 19 (left wheel in the illustrated example). Each output signal of the vehicle velocity sensor 21 is sent to a control unit 22, in response to which the control unit 22 controls rotating operation of the engine 1.

Further, the auxiliary power transmitting unit 50 includes a second continuously variable transmission (which will hereinafter be called a "second transmission") 33 having an input pulley 33a mounted on the output shaft 12 and an output pulley 33b operatively connected via a belt to the input pulley 33a, a generator/motor 35 coupled with the output pulley 33b, and a third continuously variable transmission (which will hereinafter be called a "third transmission") 53. The third transmission 53 has an input pulley 53a and an output pulley 53b operatively connected via a belt to the input pulley 33a. The auxiliary power transmitting unit 50 also includes a pulley 39 which is connected to the output pulley 53b for driving auxiliaries. More specifically, the pulley 39 drives an air-conditioning compressor 42 and a power-steering hydraulic pump 43, by means of a belt 41 and pulleys 46, 47 coupled with the compressor 42 and pump 43, respectively. Reference numeral 48 represents a battery.

In the second embodiment, there may be provided four or more continuously variable transmissions rather than just three.

What is claimed is:

1. A power transmitting apparatus for use in a hybrid vehicle including an engine having an output shaft and a generator/motor, said power transmitting apparatus comprising:

a first continuously variable transmission connected to the output shaft of the engine for causing an axle of the hybrid vehicle to rotate at a variable speed;

a second continuously variable transmission connected to the output shaft of the engine for driving said generator/motor; and a control unit for, when said generator/motor is used as an electro motor, causing output power of said motor to be transmitted to the axle of the hybrid vehicle sequentially through said second continuously variable transmission, output shaft of the engine and first continuously variable transmission.

2. A power transmitting apparatus as claimed in claim 1 wherein auxiliaries are connected to said second continuously variable transmission.

3. A power transmitting apparatus as claimed in claim 1 wherein a transmission ratio of said second continuously variable transmission is chosen to be a substantial reciprocal of a transmission ratio of said first continuously variable transmission.

4. A power transmitting apparatus as claimed in claim 1 which further comprises at least one other continuously variable transmission and said auxiliaries are connected to said other continuously variable transmission.

* * * * *